March 16, 1965 G. M. WHITE 3,174,032

ADAPTING QUANTIZED FILTER

Filed Oct. 6, 1960

Inventor:
Gerald M. White,
by Richard R. Brainard
His Attorney.

United States Patent Office 3,174,032 Patented Mar. 16, 1965

3,174,032

ADAPTING QUANTIZED FILTER

Gerald M. White, Schenectady, N.Y., assignor to General Electric Company, a corporation of New York Filed Oct. 6, 1960, Ser. No. 60,992
9 Claims. (Cl. 235—181)

Figures 1, 2:
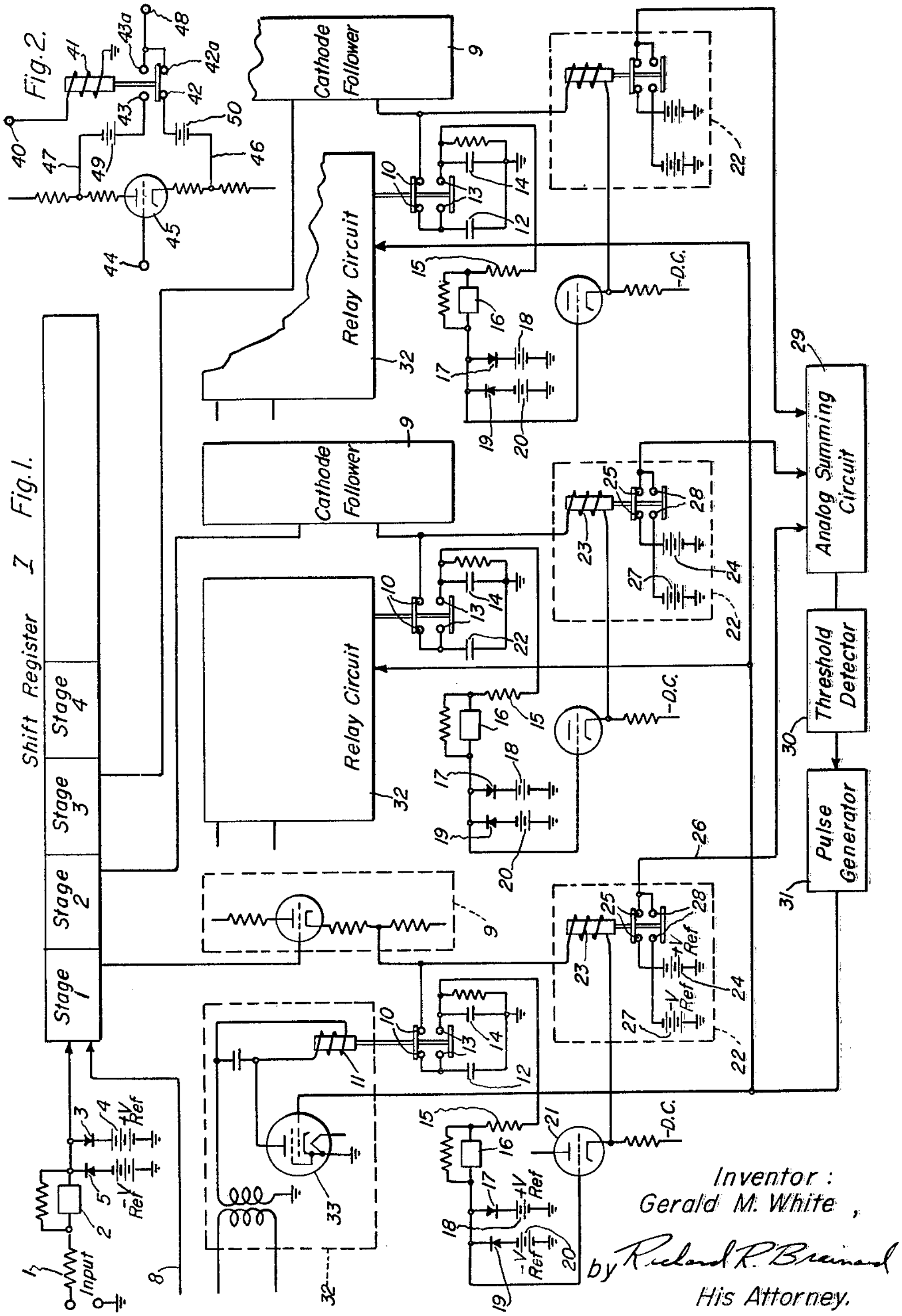

The present invention relates to systems for recognizing and storing signals and more particularly to a quantized adaptive filter for recognizing and storing unknown signals.

Recently developed information handling equipment will recognize and store repetitive signals which were previously unknown to the system. These systems, commonly referred to as adaptive systems, determine from the received input the nature of the signal to be recognized and stored.

Such a system is described, for example, in the application of Charles V. Jakowatz entitled Adaptive Filter, Serial No. 7,276, filed February 8, 1960, now Patent No. 3,114,884 and assigned to the assignee of the present application. The adaptive system described in the Jakowatz application relies heavily on analog principles. In the system there disclosed, a plurality of sampling points for the incoming signal are provided and this is accomplished by connecting the incoming signal to an analog delay line having a plurality of taps. The output of each of the taps is multiplied in a plurality of analog multipliers by the voltage stored on an associated storage capacitor. In extending this system to handle more complex waveforms, it is necessary to increase the number of sampling points and hence the number of analog multipliers. Such an extension using analog principles is quite expensive and it would, therefore, be desirable to implement the adaptive systems with circuitry which operates on quantized principles of operation.

Accordingly, it is an important object of the present invention to provide an improved quantized information handling system which recognizes and stores an unknown signal contained in an input.

It is a further object of the present invention to provide an improved adaptive filter utilizing quantized multipliers to determine the correlation between the incoming signal and the contents of storage.

It is a further object of the present invention to provide a system which utilizes quantized parameters to recognize and store a signal which is buried in noise and which is continuously changing.

In accordance with one embodiment of the invention, the input containing the signal to be recognized is quantized to two levels by means of a D.C. amplifier driven to saturation and two diode clamping circuits on the output of the D.C. amplifier. This quantization could also be performed by various other circuits; one type of circuit particularly suitable for this purpose is a Schmidt trigger circuit. This quantized input is shifted into the stages of a shift register. As the information is shifted through the stages of the shift register and new information is loaded into the lower order stages, the outputs of the various stages of the shift register provide a number of sampling points for the input. These sampling points indicate the quantized values of the input at various discrete intervals of time.

The output of each stage of the shift register is sampled by a sampling capacitor. A storage capacitor is also provided for each stage of the shift register in order to store voltages indicative of the incoming signal. A quantized multiplier is provided to continuously compare the quantized output of each stage of the shift register with the quantized value of the voltage on the associated storage capacitor. When the quantization level of the output of a particular stage of the shift register is the same as the quantization level of the associated storage capacitor the multiplier produces an output. The outputs from all of the quantized multipliers are connected to a threshold detector. This threshold detector senses the number of quantized multipliers which have outputs and produces an output itself only when the number exceeds the previous peak number. The output of the threshold detector is used to actuate a plurality of relay circuits each of which connects a sampling capacitor to its associated storage capacitor. This has the effect of averaging the voltages on the storage capacitors with the voltages on the sampling capacitors at a time when a maximum correlation exists between the two voltages. After a number of such averaging operations, the voltages on the storage capacitors provide a good indication of the nature of the repetitive signal which was contained in the input even though the characteristics of this signal were not known beforehand.

A better understanding of my invention together with further objects and advantages thereof will be better understood from a consideration of the following description taken in connection with the accompanying drawing in which:

FIGURE 1 shows a circuit diagram of one embodiment of the present invention; and FIGURE 2 shows a quantized-analog multiplier.

Referring to FIGURE 1, the input containing the signal which is to be recognized is connected through input resistor 1 to D.C. amplifier 2. This D.C. amplifier is driven to saturation by the input signal. The output of D.C. amplifier 2 is clamped to a positive and a negative reference voltage in order to establish the two levels of quantization for the input signal. If the input is positive, a diode 3 conducts to a source of positive reference voltage 4 thereby clamping the output at $+V_{ref}$. Similarly, if the input is negative a diode 5 conducts to a source of negative reference voltage 6 thereby clamping the output of D.C. amplifier 2 at $-V_{ref}$. The two level output of D.C. amplifier 2 is fed into the stages of a shift register 7. Advance pulses from a suitable pulse voltage generator (not shown) are also connected to the shift register over the line 8 to effect sampling of the input at discrete time intervals determined by the time spacing of the pulses and advancing the samples of the input taken at these discrete intervals through the stages of the shift register.

The output of each stage of the shift register is connected through a cathode follower 9 and a set of normally closed contacts 10 on relay 11 to a sampling capacitor 12. The relays 11 are actuated each time the pulse generator 31 produces an output and normally open contacts 13 on each relay closes to connect sampling capacitors 12 to associated storage capacitors 14 in parallel relation therewith.

In order to quantize the stored voltages, each storage capacitor 14 is connected through a resistor 15 to a D.C. amplifier 16 which is driven to saturation. The outputs of D.C. amplifiers 16 are each clamped to two levels of quantization by biode 17 connected to a source of positive reference voltage 18 and by diode 19 connected to a source of negative reference voltage 20.

The quantized outputs of amplifiers 16 are connected through cathode follower 21 to quantized multipliers indicated generally as 22. In the embodiment shown, its quantized multiplier takes the form of a relay 23 and the output of cathode follower 21 is connected to one end of the energizing winding on relay 23. When relay 23 is in its quiescent state a source of positive reference voltage 24 is connected through the normally closed set of contacts 25 to an output line 26. However, when the relay 23 is energized a source of negative reference voltage 27 is connected through a normally open set of contacts 28 to output line 26. Relay 23 has the property that when the level of the output of a particular stage of the shift register is at the same level as the level of the voltage on the associated storage capacitor, the relay 23 is in its quiescent state. That is, when the output of cathode follower 9 is at a negative level and the output of cathode follower 21 is at a negative level the relay 23 is quiescent. Similarly, when the output of cathode follower 9 is at a positive level and the output of cathode follower 21 is at a positive level relay 23 is in its quiescent state thus connecting a source of positive reference voltage 24 to the output line 26. However, when the levels of cathode followers 9 and 21 are different the relay is actuated thus connecting the source of negative reference voltage 27 to the output line 26. While the quantized multiplier 22 has been shown as being a relay, the multiplier may taken the form of a number of other circuits. The only requirement on the circuits is that the output meet the following conditions for the inputs enumerated in Table 1 below.

*Table 1*

| Output of Shift Register Stage | Storage Capacitor | Multiplier Output |
|---|---|---|
| $+V_{ref}$ | $+V_{ref}$ | $+V_{ref}$ |
| $+V_{ref}$ | $-V_{ref}$ | $-V_{ref}$ |
| $-V_{ref}$ | $+V_{ref}$ | $-V_{ref}$ |
| $-V_{ref}$ | $-V_{ref}$ | $+V_{ref}$ |

The outputs of the multipliers 22 are connected to an analog summing circuit 29. The analog summing circuit may be implemented by many well known techniques. The only requirement on such a circuit is that it produce an output voltage proportional to the number of inputs which are in the $+V_{ref}$ condition. The output of analog summing circuit 29 is conducted to a threshold detector 30 which detects when this output exceeds a certain threshold value. Upon such an occurrence a pulse generator 31 is energized. Pulse generator 31 in turn energizes a plurality of relay circuits 32 each of which is associated with a particular stage of shift register 7. Each relay circuit 32 includes a thyratron 33 which is fired by an output of the pulse generator 31. The thyratron energizes the relay 11 thus momentarily breaking the normally closed set of contacts 10 and closing the normally open set of contacts 13. This connects sampling capacitor 12 to storage capacitor 14 and has the effect of averaging the voltages on these two capacitors. After a suitable number of such averagings at times when the correlation between the voltages on the sampling and the storage capacitors is a maximum the voltages on storage capacitors 14 closely approximates the signal contained in the input.

The operation of the adaptive system of FIGURE 1 can be explained briefly as follows. The input containing the signal which is to be recognized is quantized to two levels by the D.C. amplifier 2. This quantized input is sampled at discrete time intervals determined by the occurrence of shift pulses on line 8 and the quantized information at these intervals is set into the first stage of the shift register and subsequently shifted to subsequent stages so that the various stages of shift register 7 represent quantized samples of the input at discrete intervals of time. The output of each stage of the shift register is continuously compared with the contents of storage as represented by the voltage on a storage capacitor 14 associated with each stage. This comparison is performed in the plurality of quantized multipliers 22. These multipliers 22 have the property that when the level of a particular stage of shift register 7 is the same as the quantized level of the voltage on the associated storage capacitor 14 the multiplier 22 will produce a positive output. All of the multipliers 22 are connected to the analog summing circuit 29 which produces an output proportional to the number of multipliers 22 which have outputs. A threshold detector 30 produces an output when the output of analog summing circuit 29 exceeds a certain threshold level indicating that there is a high correlation between the output of each stage of the shift register and the contents of storage of each of the associated storage capacitors 14. The summing circuit may be one of the known voltage adding circuits of the type used in analog computers. Such summing circuits are available, for example, from George A. Philbrick Researches, Inc., 230 Congress Street, Boston 10, Massachusetts. The threshold detector 30 atuates a pulse generator 31 which in turn energizes a plurality of relay circuits 32 each of which connects a sampling capacitor 12 to an associated storage capacitor 14 thereby averaging the voltages on these two capacitors.

The voltages on the various storage capacitors 14 provide an indication of the nature and characteristics of the repetitive signal contained in the input to the adaptive system. It is apparent that suitable output indicating means may be energized from these capacitors.

In another embodiment of the present invention, the quantized multipliers 22 of FIGURE 1 are replaced by the quantized analog multipliers of FIGURE 2. Referring to FIGURE 2, the output of a shift register stage, taken, for example, from cathode follower 9 in FIGURE 1, is connected to a gating input terminal 40. This input will determine the state of a relay 41 in accordance with the level of quantization of the output of the shift register stage. For example, when the output of the shift register is at the positive elevel of quantization the contacts *42–42a* are closed as shown in the drawing. When the output of the shift register is at a negative level of quantization the contacts *43–43a* are closed. The analog voltage stored on the associated storage capacitor 14 is connected to input terminal 44 which is in turn connected to the grid of an amplifying tube 45. The output taken from the cathode circuit of amplifying tube 45 over the line 46 is proportional to and in phase with the analog voltage on the associated storage capacitor, and is connected to the normally closed set of contacts *42–42a*. The output taken from the plate circuit of amplifying tube 45 over the line 47 is the inverted value of the analog voltage on the associated storage capacitor. Because the anode and the cathode of such a tube are at different quiescent levels, it is necessary to introduce compensation to keep the quiescent outputs at the same levels. In the embodiment shown, the source of potential 49 is inserted in the anode circuit and the source of potential 50 is inserted in the cathode circuit to obtain this compensation. When the output of the associated stage of the shift register, applied to terminal 40, is at a negative quantization level thus picking up the relay 41, the inverted value of the voltage on the storage capacitor is connected through contacts *43–43a* to the output 48 of the multiplier.

The outputs of all of the analog-quantized multipliers, taken from terminal 48 in FIGURE 2, are connected to an analog summing circuit just as shown in FIGURE 1. The advantage of using analog-quantized multipliers such as shown in FIGURE 2 over the strictly quantized multipliers of FIGURE 1 is that more information as to the nature of the signal stored in the storage capacitor is connected to the analog summing circuit. This enables the threshold detector 30 to operate at levels more indicative of a high correlation between the content of storage and the incoming signals.

While certain specific embodiments of the present invention have been shown and described, it will, of course, be understood that various other modifications may be made. The appended claims are, therefore, intended to cover any such modifications within the true spirit and scope of the invention.

What I claim as new and desire to secure by Letters Patent of the United States is:

1. A quantized adaptive system for recognizing a signal contained in an input comprising means for quantizing said input, a shift register having a plurality of stages, said quantized input being shifted into the stages of said shift register, a plurality of quantized multipliers, each of said multipliers being associated with a particular stage of said shift register, the output of each stage of said shift register being connected to one input of the associated quantized multiplier, a plurality of voltage storage means, each of said voltage storage means being associated with a particular stage of said shift register, means for quantizing the voltage stored in each of said voltage storing means, said last-named means being connected to the second inputs to each of said quantized multipliers, each multiplier providing a quantized output of one polarity when its inputs are the same polarity and providing a quantized output of the opposite polarity when its inputs are not of the same polarity, a threshold detector, the outputs of each of said multipliers being connected to said threshold detector, said threshold detector producing an output when the inputs to said threshold detector exceeds a predetermined threshold, means for connecting the output of each stage of said shift register to the associated voltage storing means, said connecting means being actuated in response to an output of said threshold detector.

2. A quantized adaptive system for recognizing a signal contained in an input comprising means for quantizing said input to two levels, a shift register having a plurality of stages, said quantized input being shifted through the stages of said shift register, a plurality of quantized multipliers, each of said multipliers being associated with a particular stage of said shift register, a plurality of voltage sampling means, each stage of said shift register being connected to an associated voltage sampling means, each of said voltage sampling means being connected to one input of an associated quantized multiplier, a plurality of voltage storing means, each of said storing means being associated with a particular stage of said shift register, means for quantizing the voltage stored in each of said voltage storing means, said last-named means being connected to the second inputs of each of said quantized multipliers, each of said multipliers producing an output at a positive level of quantization when the inputs to said multiplier are at the same level of quantization, a threshold detector, the outputs of each of said multipliers being connected to said threshold detector, said threshold detector producing an output when the number of multipliers having a positive quantization level output exceeds a predetermined threshold, and means for connecting each of said voltage sampling means to the associated voltage storage means, said last-named means being actuated by said threshold detector.

3. The quantized adaptive system recited in claim 2 wherein each of said quantized multipliers includes a relay having a two terminal energized winding, a normally closed set of contacts and a normally open set of contacts, the associated shift register stage output being connected to one terminal of said energizing winding, the quantized value of the associated voltage storing means being connected to the second terminal of said energizing winding, said relay being actuated only when said first and said second terminals are at different levels of quantization, a source of positive reference voltage, said source of positive reference voltage being connected to the output of said multiplier through said normally closed set of contacts, a source of negative reference voltage, said source of negative reference voltage being connected to the output of said multiplier through said normally open set of contacts whereby the output of said multiplier is at said positive reference voltage only when both inputs to said multiplier are at the same quantization level.

4. A quantized adaptive system for recognizing a signal contained in an input comprising means for quantizing said input, a shift register having a plurality of stages, said quantized input being shifted into the stages of said shift register, a plurality of quantized multipliers, each of said multipliers being associated with a particular stage of said shift register, the output of each stage of said shift register being connected to one input of the associated quantized multiplier, a plurality of voltage storage means, each of said voltage storage means being associated with a particular stage of said shift register, means for quantizing the voltage stored in each of said voltage storing means, said last-named means being connected to the second inputs to each of said quantized multipliers, the outputs of each of said multipliers being the product of the contents of a particular stage of said shift register and the quantized contents of storage of the associated storage means, each said multiplier comprising a relay with an actuating winding connected between the multiplier's inputs for alternatively operating the relay's contacts to provide an output of a first polarity when the multiplier's quantized inputs are the same but an output of opposite polarity if the quantized inputs are not the same, an analog summing circuit, the outputs of said multipliers being connected to said analog summing circuit, a threshold detector, the output of said analog summing circuit being connected to said threshold detector, said threshold detector producing an output only when the output of said analog summing circuit exceeds a threshold level, means for connecting each of said voltage sampling means to the associated voltage storage means, said connecting means being actuated in response to an output of said threshold detector.

5. An adaptive system for recognizing a signal contained in an input comprising means for quantizing said input, a shift register having a plurality of stages, said quantized input being shifted through the stages of said shift register, a plurality of quantized-analog multipliers each having a quantized input and an analog input, each of said multipliers being associated with a particular stage of said shift register, the output of each stage of said shift register being connected to the quantized input to said multiplier, a plurality of voltage storing means, each of said voltage storing means being associated with a particular stage of said shift register, a plurality of voltage sampling means, each of said voltage sampling means being associated with a particular stage of said shift register, each of said voltage storing means being connected to the second inputs of associated multipliers, each of said multipliers producing an output indicative of the analog voltage in the associated storage means multiplied by a positive constant when the associated stage of shift register is at a positive quantization level, the output of each of said multipliers being indicative of the analog voltage stored in the associated voltage storing means multiplied by a negative constant when the output of the associated stage of said shift register is at a negative quantization level, an analog summing circuit, the outputs of said multipliers being connected to said analog summing circuit, a threshold detector, the output of said analog summing circuit being connected to said threshold detector, said threshold detector producing an output only when the output of said analog summig circuit exceeds a threshold level, means for connecting each of said voltage sampling means to the associated voltage storage means, said connecting means being actuated in response to an output of said threshold detector.

6. The adaptive system recited in claim 4 wherein each of said quantized-analog multipliers includes means for inverting the analog voltage on each of said storage means, gating means having a gating input, two analog inputs and an output, the output of a particular stage of said shift register being connected to said gating input, the output of the associated voltage storage means being connected to a first of said analog inputs, the output of said inverting means being connected to the second of said analog inputs, said gating means being responsive to the level of the output of the associated shift register stage for selectively connecting the voltage on said storage means or the inverted voltage on said storage means to said output.

7. Apparatus for deriving a signal comprising input coupling means, means for deriving from segments of input the indications of the polarity thereof, means for storing segments of input according to polarity, means for registering the correspondence between the polarity of segments of input and contents of individual storing means, and means responsive to a predetermined correspondence for coupling input segments into the corresponding storing means.

8. Apparatus for deriving a signal comprising input coupling means and a shift register driven therefrom, means for deriving from segments of input contained in said shift register the indications of the polarity thereof, means for additionally storing the same segments of input, means for registering the correspondence between the voltage levels of segments of input in said shift register and contents of said storing means comprising plural multiplier means each providing an output of a first polarity if a segment of input contained in said shift register and the same segment stored in said storing means are the same but providing an output of opposite polarity if they are different, and means responsive to the output of said multiplier means for applying voltage levels of said input segments from said shift register into the corresponding storage means when the outputs of the said multiplier means exceed a predetermined value.

9. Apparatus for deriving a signal comprising input coupling means for an input signal, multi-stage shift register means for receiving and propagating said input signal in quantized form corresponding to plural voltage levels, said shift register being provided with a plurality of output terminals for reading out information along said register after successive shifts thereof, storage means associated with each of a plurality of said terminals, quantized multiplying means associated with each of a plurality of said terminals, said multiplying means receiving inputs from the associated terminal and the associated storage means for providing an output of a first polarity if its inputs are alike and an output of the opposite polarity if its inputs are not alike, and means responsive to the combined output levels of said multipliers for coupling each of said storage means to receive information from said associated shift register terminals.

References Cited by the Examiner

UNITED STATES PATENTS

| | | | |
|---|---|---|---|
| 2,855,147 | 10/58 | Greening | 235—181 |
| 3,022,005 | 2/62 | Dickinson | 235—154 X |
| 3,120,606 | 2/64 | Eckert | 235—160 |

OTHER REFERENCES 1959, pages 83–92, Section 3.6, Tou, Digital and Sampled Data Control Systems, McGraw-Hill.

MALCOLM A. MORRISON, *Primary Examiner.*

IRVING L. SRAGOW, *Examiner.*